United States Patent Office 3,334,024
Patented Aug. 1, 1967

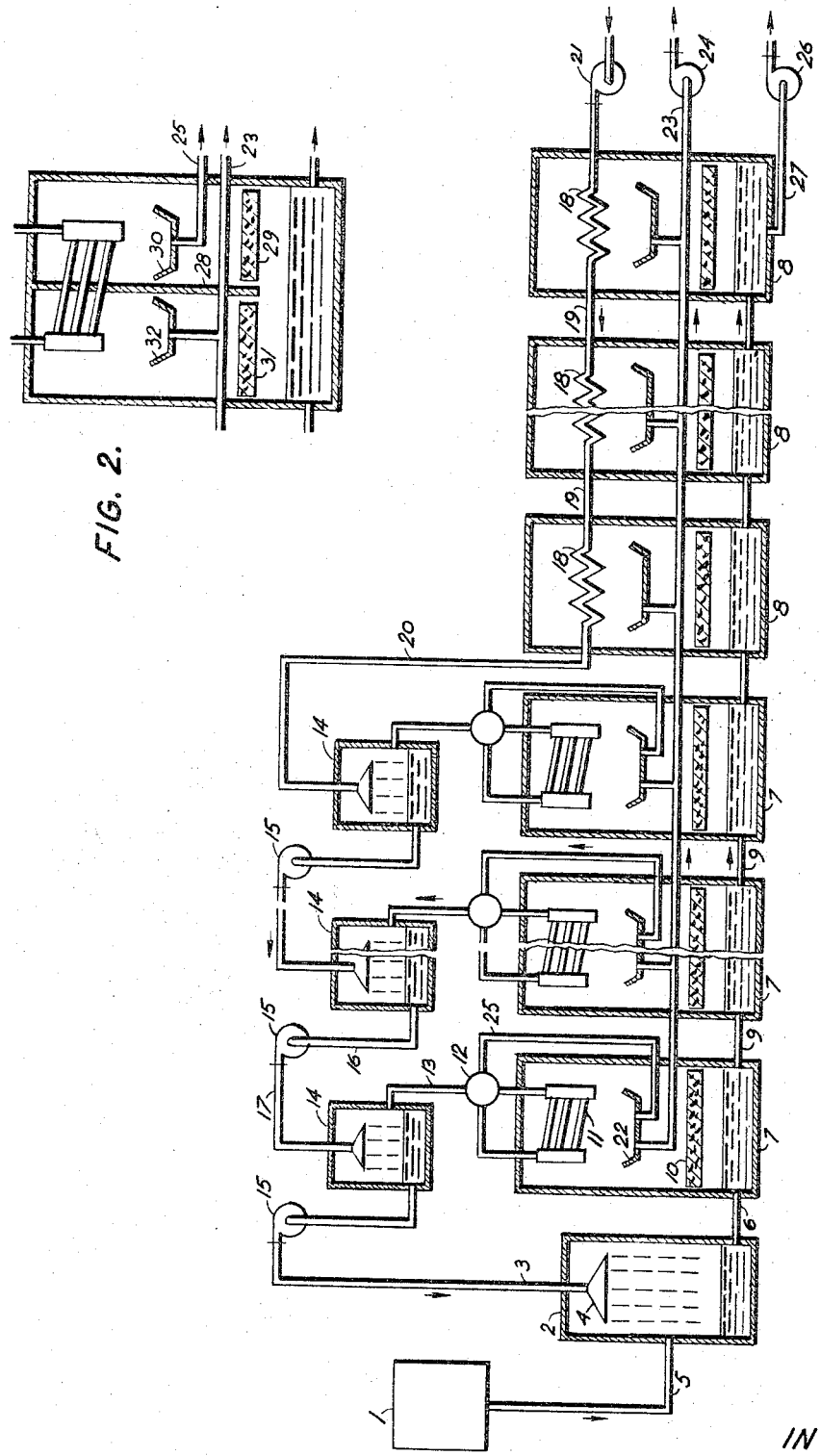

3,334,024
MULTISTAGE FLASH DISTILLATION PLANTS
Elias Zahavi, 715 Ringwood Ave.,
Pompton Lakes, N.J. 07442
Filed Mar. 17, 1965, Ser. No. 440,564
7 Claims. (Cl. 202—173)

This invention relates to apparata which convert saline water to fresh water by means of multistage flash distillation.

Multistage flash distillation is a distallation process wherein the brine is heated at a high pressure and then is passed through a multitude of stages at reduced pressures, where it evaporates. The brine is first heated by the latent heat obtained from the condensation of vapor and then by a heat introduced from the outside. In most plants the outside heat is introduced in a form of hot steam and the performance of the plant is measured by the amount of produced fresh water per pound of introduced steam. This amount is called the performance factor. It can be shown that the performance factor increases in a direct proportion to the temperature of the brine and hence a high temperature of the brine is desirable. Unfortunately, in the existing flash distillation plants this temperature is restricted by scale formation. When the brine reaches temperatures above 240 degrees F., a scale forms on the heat transfer surfaces adjacent to the hot brine cutting down severely the heat transfer and the production of fresh water. The temperature restriction imposed upon the brine is regrettable when one considers that high performance of the plant means low cost of the produced fresh water.

The present invention overcomes the problem of the temperature restriction described above. It provides a plant where the brine can be heated to high temperatures resulting in a high performance of the plant. Since a high performance reduces the cost of water, this invention permits a production of low cost water for such purposes as drinking and agricultural use, what is so urgently needed.

The substance of the present invention is as follows. The heat, which has to be added to the brine, is used to produce steam which in turn is brought in direct contact with brine for heating the brine. Now, by using a direct contact heating, the problem of scale formation is eliminated. Although the formation of scale deposits in the brine still continues, it will not obstruct the heat transfer since there are no solid heat transfer surfaces between the steam and the brine. Because of this, the brine temperature can be increased without a reduction in the heat transfer capability of the equipment. This is the object of the invention. It makes possible an increase of performance of a plant and makes the production of low cost water feasible and practical.

The invention is explained by means of accompanying drawings in which:

FIG. 1 shows a multistage flash distillation plant according to the present invention.

FIG. 2 shows a modified flash chamber of the plant.

FIG. 1 shows a flash distillation plant of present invention. The plant comprises a high temperature steam generator 1 which generates steam by using heat energy, and a direct contact brine heater 2. Brine enters the heater through the pipe 3 and is divided into a fine spray by means of the sprayer 4. Hot steam from the generator 1 enters the heater through the pipe 5 and heats the spray by direct contact. The heated brine accumulates at the bottom of the heater and is being discharged through the pipe 6. Next to the heater 2 is a series of high temperature flash chambers 7 and next to this a series of low temperature flash chambers 8. Here, by series, we mean a row of flash chambers connected to each other so that a flow of brine passes in succession through all of them. The connecting pipes between the flash chambers are designated by 9. As shown in the figure, the flash chambers 7 and 8 are partially filled with brine. Each flash chamber has above the surface of the brine a demister 10 to purify the vapor rising from the brine. Each flash chamber 7 has a water-tube boiler 11 filled with fresh water and heated by the vapor surrounding the boiler. The steam generated inside the boilers accumulates in the steam drums 12 which are integral parts of the boilers 11. The drums 12 are connected respectively, by means of the pipes 13, to the direct contact brine pre-heaters 14. The pre-heaters 14 are similar to the heater 2 described above. Each pre-heater 14 has a spray of brine which is heated by direct contact with steam coming from 13. Attached to each pre-heater is a transmission pump 15 which draws the brine accumulated at the bottom of the pre-heater. The pre-heaters 14 and pumps 15 are interconnected by means of pipes 16 and 17 forming a series of pumps and pre-heaters. This series is reverse to the series of flash chambers 7, i.e., the flow of brine in the series of pre-heaters 14 and of pumps 15 is in reverse way to the series of flash chambers 7. The series is connected by means of pipe 3 to the heater 2.

As described above, attached to the end of the series of flash chamber 7 is a series of low temperature flash chambers 8. Here, we have, instead of boilers, the surface brine pre-heaters 18. The pre-heaters 18 are standard heat exchangers which transfer heat through their walls. Brine flows through the pre-heaters 18 and are heated by vapor surrounding the pre-heaters. The pre-heaters are connected by means of pipes 19 into a series reverse to the series of flash chambers 8, i.e., the flow of brine through the series of pre-heaters 18 is in reverse way to the flow of brine through the series flash chambers 8. The series is connected by means of pipe 20 to the series of pre-heaters 14 and of pumps 15. A brine supply pump 21 is connected to the beginning of the series.

Upon heating the boilers 11 and pre-heaters 18, the vapor in the flash chambers 7 and 8 condenses and accumulates in the collectors 22. From here it is drawn by means of the pipe 23 and pump 24. Part of the condensate from collectors in the flash chambers 7 is supplied to the boilers 11. This condensate is flowed from the collectors to the steam drums 12 by means of the pipes 25 so that each boiler 11 obtains the condensate from a collector located in the same flash chamber. Left out from the description was the discharge pump 26 whose function is to draw brine from the last flash chamber 8 by means of the pipe 27.

The materials and details of construction of the items described above are those conventionally used in parts of the nature shown.

The flash distillation plant operates in the following manner. Cold brine is supplied to the plant by means of the supply pump 21. The brine flows through the series of pre-heaters 18, where it is heated by surface heating, and then through the series of pre-heaters 14, where it is heated by direct contact with steam from the boilers 11. From here the brine flows to the heater 2 where it is heated to the maximum temperature by direct contact with steam from the steam generator 1. The discharge pump 26 draws the brine from the heater 2 through the series of flash chambers 7 and 8. Because of the suction of the pump, the pressure of brine in the flash chambers is reduced, causing a flash vaporization of part of the brine in the flash chambers. The remaining brine is disposed by the pump 26 outside of the plant. The vapor in the flash chambers is purified from liquid particles by means of the demisters 10 and then it heats the boilers 11 and pre-heaters 18. Upon heating the boilers and pre-heaters, the vapor condenses and the condensate is collected in the collectors 22. From here the condensate is drawn by means of the pump 24 for use as a fresh water.

For the flash distillation plant to operate, the pressure in the flash chambers must be sufficiently reduced so as to achieve a flash vaporization. This is obtained by a proper selection of the pump 26 and the pipe connections 9. Furthermore, in order to have a heat flux from the vapor in the flash chambers 7 to the fresh water in the boilers 11, the temperature of the fresh water must be below the temperature of vapor in the flash chambers. This is obtained by arranging the pressure in each boiler 11 to be below the pressure of the respective flash chamber 7 whereby the boiling temperature of fresh water is lowered. Now the pressure in the boilers 11 is controlled by the pressure in pre-heaters 14. By a proper selection of the pumps 15 and the respective piping, we can obtain the required pressure in the pre-heaters 14 and hence in the boilers 11. The difference of pressures between the boilers 11 and the flash chambers 7 acts also as the driving force to drive the condensate through the pipes 25.

The construction and method of operation of the plant is of such nature that the production of the plant is not affected by scale formation. Hence, one can raise the maximum temperature to which brine is heated without being afraid of any adverse effects upon the heat transfer. By doing so, one can increase the performance factor of the plant. The present flash distillation plants are limited to brine temperatures of about 240 degrees F. In the flash distillation plant of present invention we may increase the brine temperature to 400 degrees F. or more, and doing so we can easily double the performance factor.

In many applications of fresh water, purities of the order of 500 p.p.m. or more of dissolved solids are acceptable. This will simplify considerably the purification of the vapor in the flash chambers. On the other hand the purity requirements placed upon the fresh water which is being supplied to the boilers 11 are of the order of 20 p.p.m. In such cases the high temperature flash chambers can be modified as shown in FIG. 2. Here the flash chamber is divided by means of a separating wall 28 into two sections of different purities. The high purity section contains a high purity demister 29, such as, for instance, an electrostatic precipitator which will purify the vapor to a purity of about 20 p.p.m. or less. The high purity condensate obtained from this vapor is collected in the collector 30 and delivered by the pipe 25 to the respective boiler. The low purity section of the flash chamber contains the demister 31 which produces vapor with more dissolved solids. The low purity condensate obtained from this vapor is collected in the collector 31 from which it is drawn by means of the pipe 23 and the pump 23 of FIG. 1.

It is to be understood that the terms of the invention herewith shown and described are to be taken as preferred example of the same and that various changes and modifications can be made therein without departing from the spirit and the scope of the invention as defined in the subjoined claims.

I claim:

1. A flash distillation plant comprising a steam generator, a direct contact brine heater adapted to heat brine by direct contact with steam from the said steam generator, a series of flash chambers connected in succession to the said heater, means to draw hot brine from the said heater through the said series of flash chambers at reduced pressure so as to obtain flash vaporization in the said flash chambers; boilers, one in each said flash chamber, adapted to boil fresh water in the said boilers and at the same time to condense the vapor in the said flash chambers by transferring heat from the vapor to the fresh water, and direct contact brine pre-heating means adapted to heat brine by direct contact with steam from the said boilers.

2. A flash distillation plant comprising a steam generator; a direct contact brine heater adapted to heat brine by direct contact with steam from the said steam generator; a series of flash chambers connected in succession to the said heater; means to draw hot brine from the said heater through the said series of flash chambers at reduced pressure so as to obtain flash vaporization in the said flash chambers; boilers, one in each said flash chamber, adapted to boil fresh water in the said boilers and at the same time to condense the vapor in the said flash chambers by transferring heat from the vapor to the fresh water; means to supply fresh water to the said boilers; means to collect the condensate in the said flash chambers; direct contact brine pre-heating means adapted to heat brine by direct contact with steam from the said boilers; and means to supply cold brine; the said boilers and the said flash chambers being so arranged in respect to each other that each said boiler has a lower pressure than the respective flash chamber; the said brine supply means, the said pre-heating means and the said heater being so arranged that the brine supplied by the said supply means passes through the said pre-heating means, whereby the brine is heated and then the brine is supplied to the said heater, where it is heated further.

3. A flash distillation plant comprising a steam generator; a direct contact brine heater adapted to heat brine by direct contact with steam from the said steam generator; a series of flash chambers conected in succession to the said heater; a brine discharge pump arranged to draw hot brine from the said heater through the said series of flash chambers at reduced pressure so as to obtain flash vaporization in the said flash chambers; demisters in the said flash chambers adapted to demist substantially the vapor; water-tube boilers, one in each said flash chamber, adapted to boil fresh water in the said boilers and at the same time to condense the mist-free vapor in the said flash chambers by transferring heat from the vapor to the fresh water; means to supply fresh water to the said boilers; collectors to collect the condensate in the said flash chambers; means to draw the condensate from the said collectors; direct contact brine pre-heaters, one per each said boiler, connected respectively to the said boilers and adapted to heat brine by direct contact with steam from the said boilers; brine transmission pumps, one per each said pre-heater, arranged to draw brine respectively from the said pre-heaters; and means to supply cold brine; the said pre-heaters and the said brine transmission pumps being connected into a series reverse to the said series of flash chambers; the said boilers and the said flash chambers being so arranged in respect to each other that each said boiler has a lower pressure than the respective flash chamber; the said brine supply means, the said series of pre-heaters and of brine transmission pumps, and the said heater being so arranged that the brine supplied by the said supply means passes through the said series of pre-heaters and of brine transmission pumps, whereby the brine is heated, and then the brine is supplied to the said heater, where it is heated further.

4. A flash distillation plant comprising a high temperature steam generator; a direct contact brine heater adapted to heat brine by direct contact with steam from the said steam generator; a series of high temperature flash chambers connected in succession to the said heater; a series of low temperature flash chambers connected in succession to the end of the said series of high temperature flash chambers; a brine discharge pump arranged to draw hot brine from the said heater in succession through the said series of high temperature flash chambers and the said series of low temperature flash chambers at reduced pressure so as to obtain flash vaporization in the said flash chambers; demisters in the said flash chambers adapted to demist substantially the vapor; a brine supply pump to supply cold brine; a series of surface brine pre-heaters passing in a reverse way through the said series of low temperature flash chambers, adapted to heat cold brine in the said pre-heaters and at the same time to condense the mist-free vapor in the said low temperature flash chambers by transferring heat from the vapor to the brine;

water-tube boilers, one in each said high temperature flash chamber, adapted to boil fresh water in the said boilers and at the same time to condense the mist-free vapor in the said high temperature flash chambers by transferring heat from the vapor to the fresh water; collectors to collect the condensate in the said flash chambers; means to draw the condensate from the said collectors; means to direct part of the condensate from the said collectors to the said boilers; direct contact brine pre-heaters, one per each said boiler, connected respectively to the said boilers and adapted to heat brine by direct contact with steam from the said boilers; and brine transmission pumps, one per each said direct contact brine pre-heater, arranged to draw brine respectively from the said direct contact brine pre-heaters; the said direct contact brine pre-heaters and the said brine transmission pumps being connected into a series reverse to the said series of high temperature flash chambers; the said boilers and the said high temperature flash chambers being so arranged in respect to each other that each said boiler has a lower pressure than the respective high temperature flash chamber; the said brine supply pump, the said series of surface brine pre-heaters, the said series of direct contact brine pre-heaters and of brine transmission pumps, and the said direct contact brine heater being so arranged that the cold brine supplied by the said brine supply pump passes through the said series of surface brine pre-heaters, whereby the brine is heated, then the brine passes through the said series of direct contact brine pre-heaters and of brine transmission pumps, whereby the brine is heated further, and then the brine is supplied to the said direct contact brine heater, where it is heated further.

5. A flash distillation plant as defined in claim 4, wherein each said boiler receives the condensate from a said collector located in the same flash chamber.

6. A flash distillation plant as defined in claim 5, wherein each said high temperature flash chamber has a high purity demister to produce a substantially mist-free vapor of high purity, a low purity demister to produce a substantially mist-free vapor of low-purity, means to provide a separate condensation of the high purity vapor and of the low purity vapor, a high purity condensate collector to collect the condensate from the high purity vapor, and a low purity condensate collector to collect the condensate from the low purity vapor; and wherein the said boilers receive the condensate from the said high purity condensate collectors.

7. A flash distillation plant as defined in claim 6, wherein the said high purity demisters are electrostatic precipitators.

No references cited.

NORMAN YUDKOFF, *Primary Examiner.*

J. SOFER, *Assistant Examiner.*